United States Patent
Wong et al.

(10) Patent No.: US 9,148,192 B1
(45) Date of Patent: Sep. 29, 2015

(54) TRANSCEIVER FOR PROVIDING A CLOCK SIGNAL

(71) Applicant: Xilinx, Inc., San Jose, CA (US)

(72) Inventors: Alan C. Wong, Sunnyvale, CA (US);
Christopher J. Borrelli, Campbell, CA (US); Loren Jones, Aromas, CA (US);
Seu Wah Low, San Jose, CA (US);
Parag Upadhyaya, Los Gatos, CA (US);
Robert M. Ondris, Santa Clara, CA (US); Sarosh I. Azad, Fremont, CA (US)

(73) Assignee: XILINX, INC., San Jose, CA (US)

( * ) Notice: Subject to any disclaimer, the term of this patent is extended or adjusted under 35 U.S.C. 154(b) by 148 days.

(21) Appl. No.: 13/962,468

(22) Filed: Aug. 8, 2013

(51) Int. Cl.
*H04B 1/40* (2015.01)

(52) U.S. Cl.
CPC ..................................... *H04B 1/40* (2013.01)

(58) Field of Classification Search
CPC .................................... H03L 7/07; H03L 7/08
See application file for complete search history.

(56) References Cited

U.S. PATENT DOCUMENTS

| 7,071,756 B1* | 7/2006 | Vadi et al. ..................... 327/293 |
| 2007/0019766 A1* | 1/2007 | Bereza et al. .................. 375/354 |
| 2011/0285434 A1* | 11/2011 | Shumarayev et al. ........ 327/156 |
| 2012/0256670 A1* | 10/2012 | Ding et al. .................... 327/175 |
| 2014/0198810 A1* | 7/2014 | Jones et al. ................... 370/507 |

OTHER PUBLICATIONS

Xilinx, Inc., *7 Series FPGAs GTX/GTH Transceivers*, UG476 (v1.9.1), Apr. 22, 2013, pp. 26, 31, 36, 40, 41, 42, 46, 90, 99, 100, 104-107, 125, 127, 159, 201, 234, and 248 (29 pages total), Xilinx, Inc., San Jose, California, USA.

Xilinx, Inc., *7 Series FPGAs Clocking Resources User Guide*, UG472 (v1.7), Apr. 3, 2013, pp. 34-44 (15 pages total), Xilinx, Inc., San Jose, California, USA.

\* cited by examiner

*Primary Examiner* — Albert T Chou
(74) *Attorney, Agent, or Firm* — W. Eric Webostad

(57) ABSTRACT

An apparatus relating generally to a transmitter-side of a transceiver or a transmitter used to provide a clock signal is disclosed. In this apparatus, a first signal source is to provide a first periodic signal. A second signal source is to provide a second periodic signal. A first multiplexer is coupled to receive the first periodic signal and the second periodic signal to provide a selected one thereof as a first selected output. A phase interpolator is coupled to the first multiplexer to receive the first selected output. The phase interpolator includes a second multiplexer. The second multiplexer is coupled to receive the first selected output and a phase-interpolated version of the first selected output to output a selected one thereof as a second selected output. A divider is coupled to the second multiplexer to receive the second selected output to provide the clock signal.

18 Claims, 9 Drawing Sheets

TRANSCEIVER FOR PROVIDING A CLOCK SIGNAL

TECHNICAL FIELD

The following description relates to integrated circuit devices ("ICs"). More particularly, the following description relates to a transceiver for providing a clock signal for an IC.

BACKGROUND

Demand for bandwidth has increased. Accordingly, ICs have increasingly more transceivers to meet such increasing demand for bandwidth. Such transceivers may have associated therewith one or more phase-locked loops ("PLLs"). Furthermore, such ICs may include one or more clock modules, and such clock modules may each include a PLL. Conventionally, such clock modules have been used to provide a system clock signal separate from clocking of such transceivers. In the past, transceiver PLLs were not used to provide system clock signals for any of several reasons. For example, because a transceiver may be interrupted during a reset thereof, a transceiver clock signal could not be used as a system clock signal for lack of continuity or stability. Furthermore, for a programmable logic device, an array of programmable resources ("programmable fabric") had to have a same data width as a transceiver data width as only one frequency could be produced for such transceiver clock signal. Lastly, in applications where a transceiver buffer between a Physical Coding Sublayer block ("PCS") and a Physical Medium Attachment Sublayer block ("PMA") is bypassed, a transmitter phase interpolator ("PI") may rotate preventing use of a clock output from such PI from being used as a system clock signal.

Hence, it would be desirable to provide an IC that overcomes one or more of the above limitations in order to provide a more robust ability to use a transceiver PLL to provide a system clock signal to reduce the number of clock modules on such an IC.

SUMMARY

An apparatus relates generally to a transmitter-side of a transceiver or a transmitter used to provide a clock signal. In such an apparatus, a first signal source is to provide a first periodic signal. A second signal source is to provide a second periodic signal. A first multiplexer is coupled to receive the first periodic signal and the second periodic signal to provide a selected one thereof as a first selected output. A phase interpolator is coupled to the first multiplexer to receive the first selected output. The phase interpolator includes a second multiplexer. The second multiplexer is coupled to receive the first selected output and a phase-interpolated version of the first selected output to output a selected one thereof as a second selected output. A divider is coupled to the second multiplexer to receive the second selected output to provide the clock signal.

Another apparatus relates generally to a receiver-side of a transceiver or a receiver used to provide a clock signal. In such an apparatus, a first signal source is to provide a first periodic signal. A second signal source is to provide a second periodic signal. A multiplexer is coupled to receive the first periodic signal and the second periodic signal to provide a selected one thereof as a selected output. A phase interpolator is coupled to the multiplexer to receive the selected output to provide a phase-interpolated version of the selected output. The phase-interpolated version of the selected output is provided as an output of the phase interpolator. A divider is coupled to the phase interpolator to receive the phase-interpolated version of the selected output to provide a clock signal. A plurality of buffers is coupled to the divider to receive the clock signal.

A method relates generally to operation of a plurality of clock buffers. In such a method, the plurality of buffers is driven with a same clock source obtained from a transceiver. A multiplexer selection signal is obtained for the plurality of buffers. Dividers of the plurality of buffers are selectively masked responsive to the multiplexer selection signal. The dividers are coupled to receive a plurality of clock signals sourced from the clock source.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
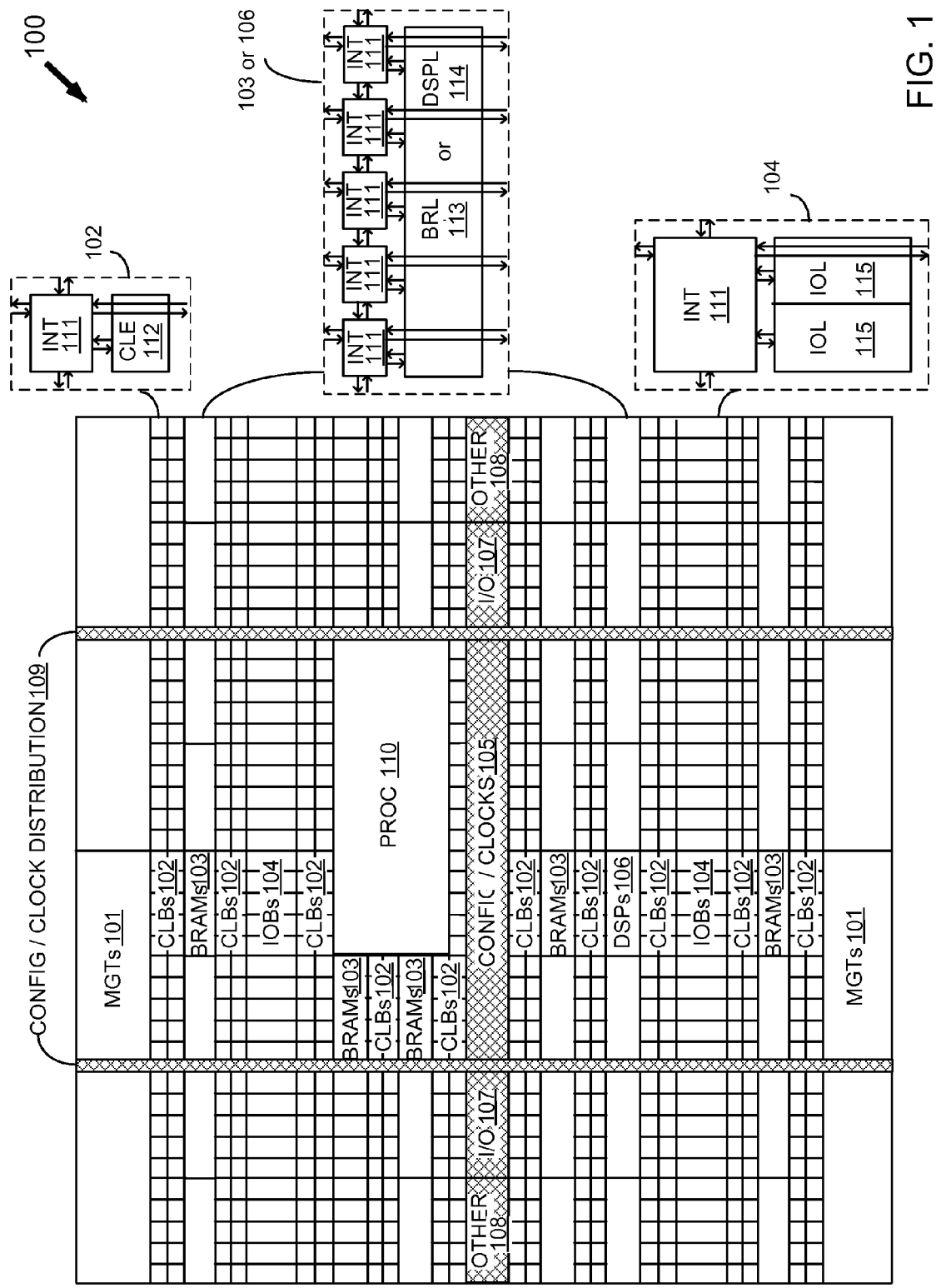
FIG. 1 is a simplified block diagram depicting an exemplary columnar Field Programmable Gate Array ("FPGA") architecture.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Because one or more of the below-described examples herein are described using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Before describing the examples illustratively depicted in the several figures, a general introduction is provided to further understanding.

High speed transceivers, such as described for example in a User Guide entitled "7 Series FPGAs GTX/GTH Transceivers" dated Apr. 22, 2013 (UG476 ver. 1.9.1) at pages 26, 31, 36, 40, 41, 42, 46, 90, 99, 100, 104-107, 125, 127, 159, 201, 234, and 248 which is available online and/or from Xilinx Inc. of San Jose, Calif. ("Xilinx"), may allow a clock signal to be output from a transmitter and/or a receiver. These transceivers may operate at gigabit rates, as is known. However, such output clock signals have one or more limitations associated with providing a system clock signal or user clock signal for a user design instantiated in such an FPGA. Again, because a transceiver may be interrupted during a reset thereof, a transceiver clock signal could not be used as a system clock signal for lack of continuity or stability. Furthermore, for a programmable logic device, an array of programmable resources ("fabric") had to have a same data width as a transceiver data width as only one frequency could be produced for such transceiver clock signal. Along those lines, for applications where a transceiver internal data width is different than fabric interface data width, a fabric or clock module PLL ("fabric PLL") and fabric clock buffers ("clock buffers") are used. A transmitter may be limited to an on-board reference clock or line rate dependent parallel clock. Thus, heretofore, a fabric PLL and at least one clock buffer were used for applications having a different frequency than that of a transmitter. Protocols that have rate change parameters, such as PCIe and SATA, for example, may be limited to use of an on-board reference clock together with a fabric PLL and clock buffers to generate a system clock frequency. Lastly, in applications where a transceiver buffer between a Physical Coding Sublayer block ("PCS") and a Physical Medium Attachment Sublayer block ("PMA") is bypassed, a transmitter phase interpolator ("PI") may rotate preventing use of a clock output from such PI from being used as a system clock signal. Clocking of such transceivers and clock buffers are described in additional detail in a User Guide entitled "7 Series FPGAs Clocking Resources" dated Apr. 3, 2013 (UG472 ver. 1.7) for example at pages 34-44, which is available online and/or from Xilinx. For purposes of clarity by way of example, FPGAs are described; however, other ICs that have one or more PLLs for a receiver, transmitter, and/or a transceiver, as well as one or more PLLs for clock modules or clock management tiles, may benefit from the following description.

As described below in additional detail, a transceiver and a clock buffer, sometimes referred to a "global" clock buffer, are described that allow a clock signal generated for a transceiver to be used as a user clock signal or system clock signal ("system clock signal"). This allows for there to be fewer, if any, clock modules or clock management tiles in an IC, such as an FPGA for example. Such transceiver may have a transmitter and a receiver that may be coupled to at least one clock buffer that may be associated for such purposes.

With the above general understanding borne in mind, various exemplary embodiments for a transceiver and a clock buffer are generally described below.

Figure 2:
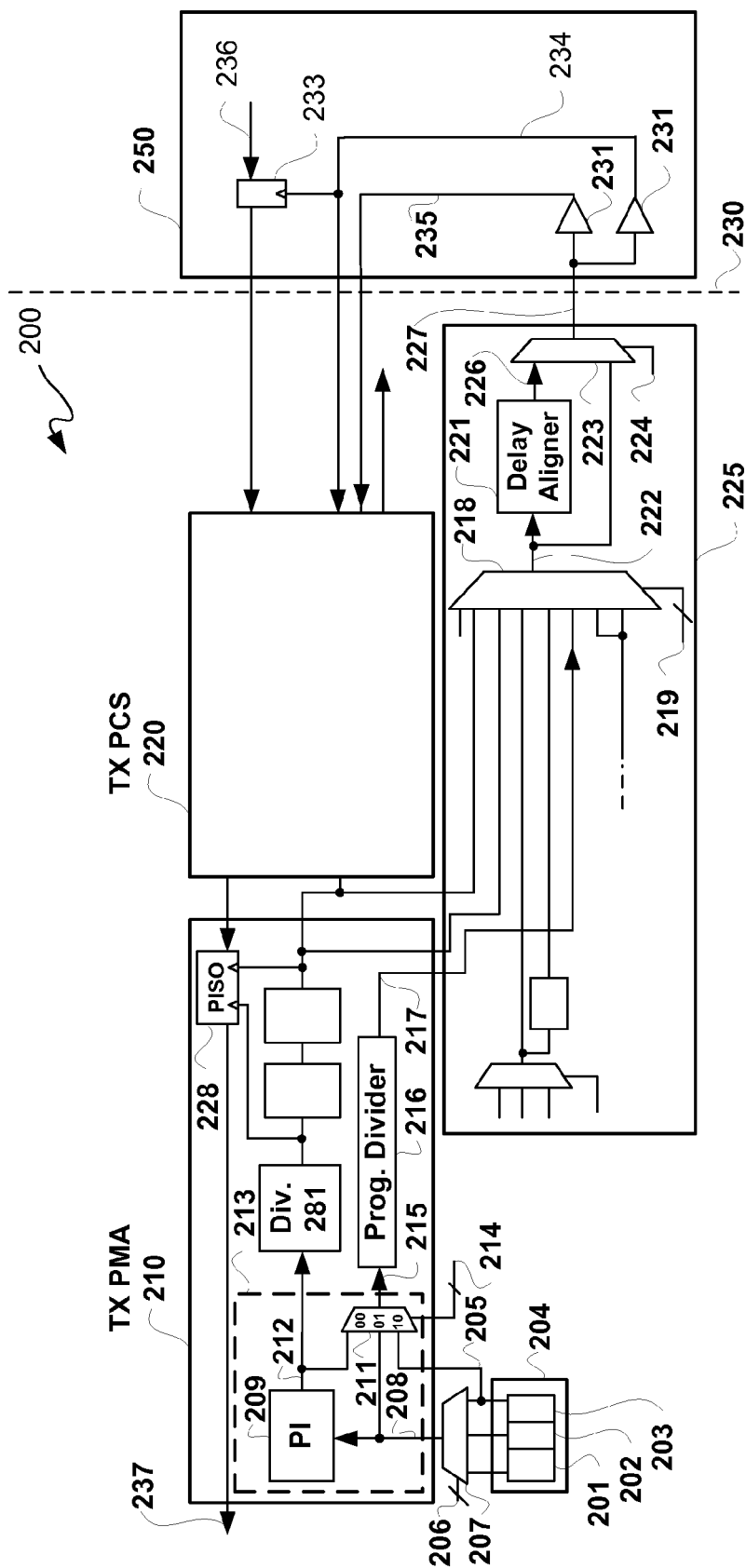
FIG. 2 is a block diagram depicting an exemplary transmitter or transmitter portion of a transceiver ("TX") coupled to one or more phase-locked loops ("PLLs").

FIG. 2 is a block diagram depicting an exemplary transmitter or transmitter portion of a transceiver ("TX") 200 coupled to one or more PLLs 204. TX 200 includes a high-speed clock multiplexer 207, a bypass path 205, a clock architecture block 225, a TX PMA 210, and a TX PCS 220. A TX-to-fabric interface 230 may couple TX 200 to fabric 250. Fabric 250 may include one or more clock buffers 231, as well as one or more registers 233. Registers 233 may be used to register output data 236 for input to TX PCS 220 of TX 200. Many known components to TX 200 are not described in detail for purposes of clarity.

PLLs 204 may include a first quadrature PLL ("QPLL") 201, a second QPLL 202, and a channel PLL ("CPLL") 203. Respective outputs of such PLLs 204 may be provided to a high-speed clock multiplexer 207. Selection of which PLL 204 output to use may be controlled by a TX PLL clock select signal 206 provided to high-speed clock multiplexer 207, which in this example is a 2-bit wide signal. Output 208 of high-speed clock multiplexer 207 may be provided as an input to PI 213 of TX PMA 210. PI 213 may be a PI 209 with the addition of a high-speed clock multiplexer 211. High-speed clock multiplexer 211 is shown separately from PI 209 for purposes of clarity.

Along the above lines, output 208 of high-speed clock multiplexer 207 may be provided as an input PI 209 and as an input to high-speed clock multiplexer 211. Another input to high-speed clock multiplexer 211 may be an output of CPLL 203 provided via bypass path 205 coupled to high-speed clock multiplexer 211. Yet another input to high-speed clock multiplexer 211 may be an output 212 of PI 209. Output 212 may be conventionally provided to other components of TX PMA 210, including without limitation TX divider 281, as well as being input to high-speed clock multiplexer 211. Output of TX divider 281 may be provided for example to clock PISO 228 for output of data therefrom.

Selection of which input to provide as output 215 from high-speed clock multiplexer 211 may be controllably selected responsive to a TX programmable clock select signal 214. Output 215 may be provided as an input to programmable divider 216.

For purposes of clarity by way of example and not limitation, three states 00, 01, and 10 for TX programmable clock select signal 214 are generally used to indicate which system clock generation path is to be used to provide output 215 from high-speed clock multiplexer 211. However, it should be understood that these or other states may be used for such selection.

For TX programmable clock select signal 214 being 00, a post-TX PI clock path may be used to provide output 212, which may be any output of PLLs 204 after phase interpolation by PI 209, as output 215 for input to programmable divider 216 to generate one or more system clocks with a specified parts per million ("ppm") phase offset generated by TX PI 209. Using this clock input 215 to programmable divider 216 and using a divided clock signal 217 output therefrom along with a clock buffer 231, a system clock may be generated to support any of a variety of video protocols, such as for example SDI, HD-SDI, or 3G-SDI, or optical transport network ("OTN") protocols. For any of these applications, one TX PLL of any of PLLs 204 may be shared for a data path and a clock generation path, such that a fabric PLL may be omitted for such application.

For TX programmable clock select signal 214 being 01, a pre-TX PI clock path may be used to provide output 208, which may be any output of PLLs 204 before phase interpolation by PI 209, as output 215 for input to programmable divider 216 to generate one or more system clocks. This system clock generation path may be used to support applications where a minimal or fixed latency is used, such as CPRI for example. Other protocols that have a lane-to-skew parameter, such as XAUI and PCIe for example, may likewise use this system clock generation path. For any of these applications, one TX PLL of any of PLLs 204 may be shared for a data path and a clock generation path, such that a fabric PLL may be omitted for such application.

For TX programmable clock select signal 214 being 01, a bypass clock path may be used to provide CPLL 203 output as output 215 for input to programmable divider 216 to generate one or more system clocks. This bypass path 205 provides flexibility to use a CPLL 203 to generate one or more system clocks, while optionally allowing either of QPLL 201 or 202 to be used for a data path. This system clock generation path may be used for protocols with a rate change parameter, as a QPLL may be reconfigured in order to support different line rates, while a CPLL output may be unaffected by such reconfiguration. In other words, such CPLL output is not interrupted, and thus it is stable for this type of application. Again, a TX PLL may be used to generate a system clock signal; however, for this application, more than one TX PLL are used.

Each of the above-described TX system clock generation paths are independent system clock generation paths. Furthermore, as will be better understood from the following description, a system clock generated signal may go through four multiplexers and a divider at a minimum to reach a clock buffer 231. At a maximum, a system clock generated signal may go through four multiplexers, a phase interposer, a divider, and a delay aligner. More generally, a phase interpolator and/or a delay aligner may be included or not in a minimum system clock generation path. However, by providing such a system clock generation path, TX PLL dependency on a fabric PLL to generate a system clock signal may be eliminated.

Programmable divider 216 of TX PMA 210 may be a high-speed programmable divider that taps off a high-frequency PLL-based output clock 215. Output 217 of programmable divider 216 may be a divided clock signal for parallel operations, such as for a serial-to-parallel conversion, and thus such output clock signal may be referred to a "parallel clock signal." This divided clock signal may be independent of a TX data path. Along those lines, post-TX PI, buffer bypass, and pre-TX PI (i.e., rate of change) applications can be supported by using an existing set of transceiver PLLs, namely two or more TX PLLs, such as a CPLL and a QPLL for example. Dependency on a fabric PLL for any or all of such applications may be removed, which reduces complexity of implementing any or all of such applications. Furthermore, this reduced complexity may promote user ease of use and/or reduce time to market. Programmable dividers 216 may have divider values of 4, 5, 8, 10, 16, 16.5, 20, 32, 33, 40, 64, and 66; however, these or other divider values may be used.

Divided clock signal 217 may be provided to a clock selection multiplexer 218 of clock architecture block 225. Clock architecture block 225 may further include a TX delay aligner 221, a clock selection multiplexer 218, and a delay selection multiplexer 223. In addition to a divided clock signal 217, other clock signals, such as a TX PCS clock, a TX PMA clock, other TX divided clocks, and test signals, may be provided as inputs to clock selection multiplexer 218. Furthermore, other components may be included in clock architecture block 225. However, these other signals and components are not described in unnecessary detail for purposes of clarity.

Output 222 of clock selection multiplexer 218 may be selected responsive to select signal 219, which in this example is a 3-bit wide signal. Divided clock signal 217 may be provided as output 222 from clock selection multiplexer 218 responsive to select signal 219. Output 222 of clock selection multiplexer 218 may be provided to TX delay aligner 221 and as an input to delay selection multiplexer 223. Output 226 of TX delay aligner 221 may be provided as another input to delay selection multiplexer 223. Output 227 of delay selection multiplexer 223 may be provided responsive to select signal 224 provided as a control select to delay selection multiplexer 223. Output 227 may be provided across TX-to-fabric interface 230.

One or more clock buffers 231 may be coupled on a fabric side of TX-to-fabric interface 230 to receive output 227, such as for example a TX output clock signal 227. Output 227 may be used by a clock buffer 231 to provide a system clock signal. Clock buffers 231 may reside in fabric 250 and may be dedicated to TX 200. Outputs 235 and 234 of clock buffers 231 may be respective system clock signals, as described below in additional detail. Such system clock signal 235 and/or 234 may be used to clock one or more fabric registers 233, as well as registers of TX PCS 220, for example.

Figure 3:
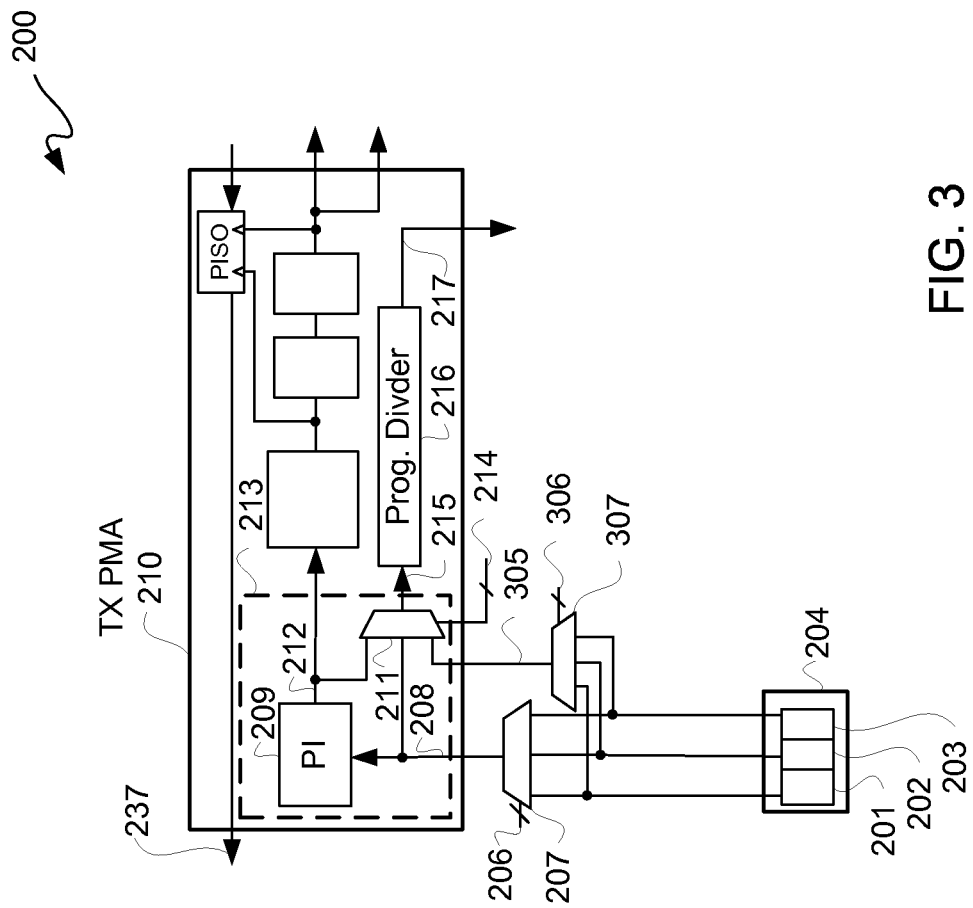
FIG. 3 is a block diagram depicting another exemplary transmitter or transmitter portion of a transceiver ("TX") coupled to one or more PLLs.

FIG. 3 is a block diagram depicting another exemplary transmitter or transmitter portion of a transceiver ("TX") 200 coupled to one or more PLLs 204. TX 200 of FIG. 3 is the same as TX 200 of FIG. 2, except for the following differences. Along those lines, TX PMA 210, TX PCS 220, clock architecture block 225, and fabric 250 of FIG. 2 are the same for both TXs 200 of FIGS. 2 and 3. However, TX 200 of FIG. 3 includes another high-speed clock multiplexer 307. Like high-speed clock multiplexer 207, respective outputs of PLLs 204 may be provided to inputs of both high-speed clock multiplexers 207 and 307. Selection of which PLL 204 output to use for output of high-speed clock multiplexer may be controlled by a TX PLL clock select signal 306 provided to high-speed clock multiplexer 307, which in this example is a 2-bit wide signal. Output 305 of high-speed clock multiplexer 307 may be provided as an input to high-speed clock multiplexer 211 in place of by-pass path 205. Along the above lines, high-speed clock multiplexer 307 may be used as a bypass path multiplexer, but adds flexibility for selection of any PLL output of PLLs 204 for such bypass input to high-speed clock multiplexer 211. This increase flexibility in which secondary PLL may be used may reduce the number of fabric PLLs to be dedicated to TX 200 of FIG. 3.

Use of a TX clock output to provide a system clock signal is not limited to a TX. Separate or in addition to use of a TX clock output to provide a system clock signal, a receiver or receiver portion of a transceiver ("RX") may be used to provide an RX clock output to provide a system clock signal, as described in addition detail with reference to FIG. 4.

Figure 4:
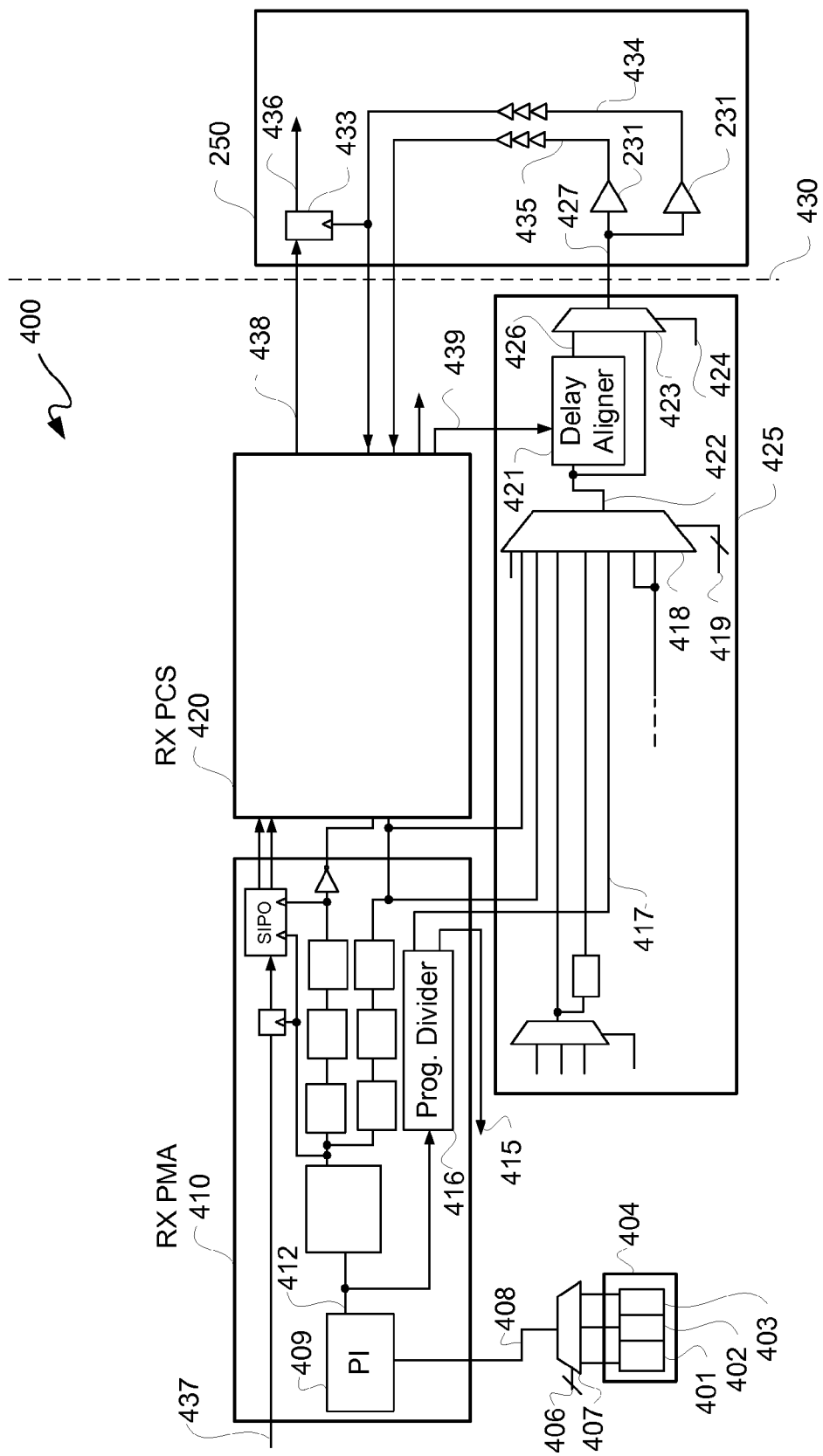
FIG. 4 is a block diagram depicting an exemplary receiver or receiver portion of a transceiver ("RX") coupled to one or more PLLs.

FIG. 4 is a block/circuit diagram depicting an exemplary RX 400 coupled to one or more PLLs 404. RX 400 includes a high-speed clock multiplexer 407, a clock architecture block 425, a RX PMA 410, and a RX PCS 420. An RX-to-fabric interface 430 may couple RX 400 to fabric 250. Fabric 250 may include one or more clock buffers 231, as well as one or more registers 433. Registers 433 may be used to register input data 438 from RX PCS 420 to provide output data 436. Many known components to RX 400 are not described in detail for purposes of clarity.

PLLs 404 may include a first QPLL 401, a second QPLL 402, and a CPLL 403. PLLs 404 may be the same PLLs or independent PLLs with respect to PLLs 204 of FIG. 2.

Respective outputs of such PLLs 404 may be provided to a high-speed clock multiplexer 407. Selection of which PLL 404 output to use may be controlled by an RX PLL clock select signal 406 provided to high-speed clock multiplexer 407, which in this example is a 2-bit wide signal. Output 408 of high-speed clock multiplexer 407 may be provided as an input to PI 409 of RX PMA 410.

Along the above lines, output 408 of high-speed clock multiplexer 407 may be provided as an input PI 409 to obtain an output 412 of PI 409. Output 412 may be provided to other components of RX PMA 410, as well as being input to programmable divider 416.

Programmable divider 416 of RX PMA 410 may be a high-speed programmable divider that taps off a high-frequency PLL-based output clock 412. Output 417 of programmable divider 416 may be an RX programmably divided clock signal for parallel operations, such as for a serial-to-parallel conversion, and thus such output clock signal may be referred to a "parallel clock signal." Divided clock signal 417 may be independent of an RX data path used to provide output data 438. Additionally, a separate RX recovered clock output 415 may be provided from programmable divider 416 to bypass clock architecture block 425. For this example, programmable divider 416 may have divider values of 4, 5, 8, 10, 16, 16.5, 40, 32, 33, 40, 64, and 66; however, these or other divider values may be used.

Along those lines, post-RX PI (i.e., rate of change) applications can be supported by using an existing set of transceiver PLLs, namely one or more RX PLLs, such as a CPLL and a QPLL for example. Dependency on a fabric PLL for any or all of such applications may be removed, which reduces complexity of implementing any or all of such applications. Furthermore, this reduced complexity may promote ease of use and/or reduce time to market.

Divided clock signal 417 may be provided to a clock selection multiplexer 418 of clock architecture block 425. Clock architecture block 425 may further include an RX delay aligner 421, and a delay selection multiplexer 423. In addition to a divided clock signal 417, other clock signals, such as an RX PCS clock, an RX PMA clock, other RX divided clocks, and test signals, may be provided as inputs to clock selection multiplexer 418. Furthermore, other components may be included in clock architecture block 425. However, these other signals and components are not described in unnecessary detail for purposes of clarity.

Output 422 of clock selection multiplexer 418 may be selected responsive to select signal 419, which in this example is a 3-bit wide signal. Divided clock signal 417 may be provided as output 422 from clock selection multiplexer 418 responsive to select signal 419. Output 422 of clock selection multiplexer 418 may be provided to RX delay aligner 421 and as an input to delay selection multiplexer 423. Output 426 of RX delay aligner 421 may be provided as another input to delay selection multiplexer 423. Output 427 of delay selection multiplexer 423 may be provided responsive to select signal 424 provided as a control select to delay selection multiplexer 423. Output 427 may be provided across RX-to-fabric interface 430.

One or more clock buffers 231 may be coupled on a fabric side of RX-to-fabric interface 430 to receive output 427, such as for example an RX output clock signal 427. A clock buffer 231 driven by an RX output clock signal 427 may be used to provide a system clock signal. Clock buffers 231 may reside in fabric 250 and may be dedicated to RX 400. Outputs 435 and 434 of clock buffers 231 may be respective system clock signals, as described below in additional detail. Such system clock signal 435 and/or 434 may be used to clock one or more fabric registers 433, as well as registers of RX PCS 420, for example.

The above-described RX system clock generation path is an independent system clock generation path. Furthermore, as will be better understood from the following description, a system clock generated signal may go through a PI, two multiplexers and a divider at a minimum to reach a clock buffer 231. By providing such a system clock generation path, RX PLL dependency on a fabric PLL to generate a system clock signal may be eliminated.

Clock buffers 231 in FIGS. 2 and 4 may be used to generate phase aligned clocks, as described below in additional detail with reference to FIG. 5.

Figure 5:
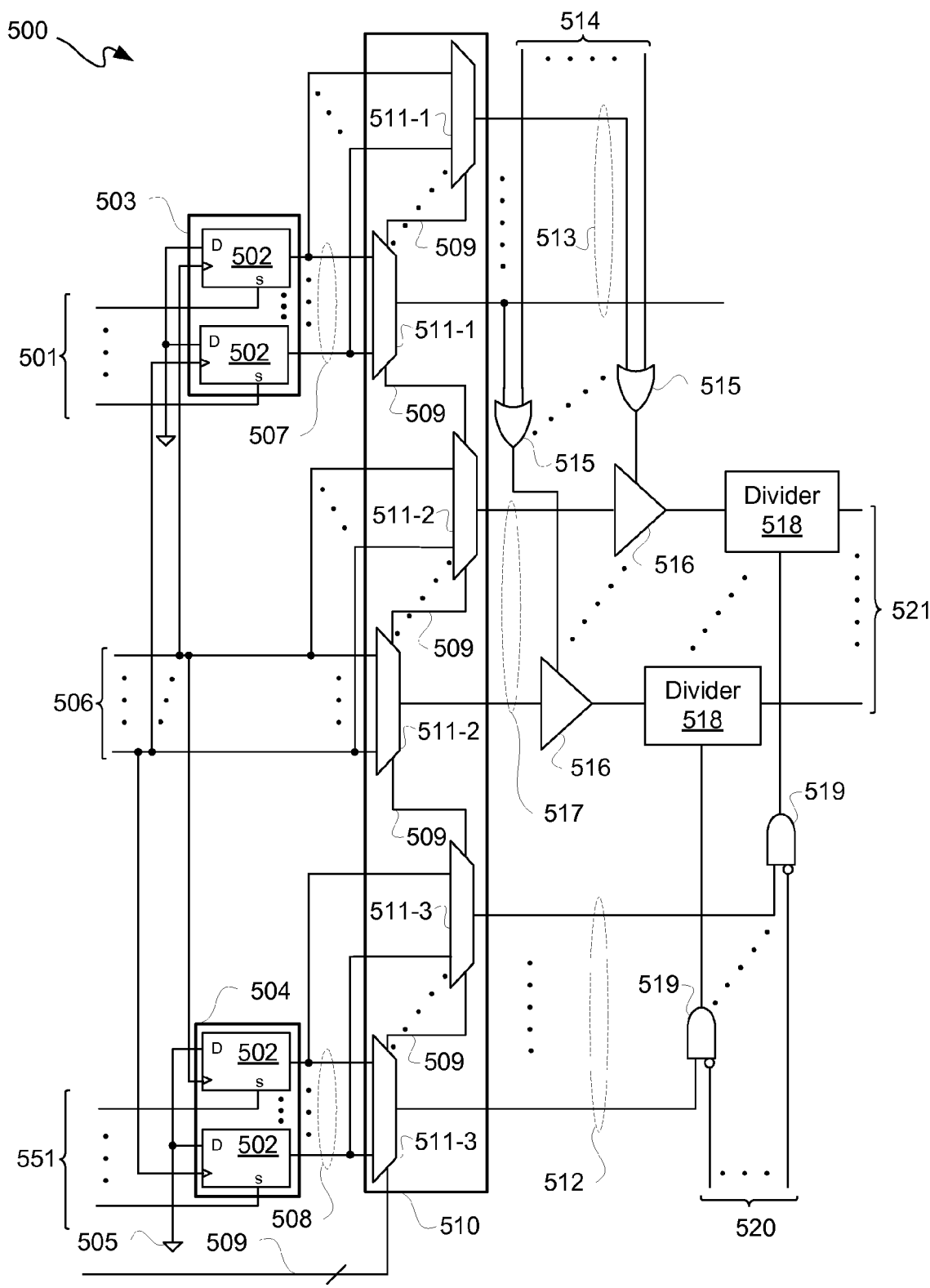
FIG. 5 is a block/circuit diagram depicting exemplary clock buffers, which may be multiple instances of clock buffers of either of FIG. 2 or 4.

FIG. 5 is a block/circuit diagram depicting exemplary clock buffers 500, which may be multiple instances of clock buffers 231. Generally, clock buffers ("BUFG_GT") 231 may be global buffers dedicated to a transceiver. In this example, divider values from 1 to 8 are built into clock buffers 231, such as to have the capability to further divide down an incoming clock signal to produce a system clock signal. However, in other examples, other divider ranges may be used. Furthermore, in this example, output clocks from clock buffers 231 are positive edge phase aligned to ensure proper transceiver operation, namely proper data width conversion between a transceiver internal data width and a fabric interface. However, in other examples, negative edge phase alignment may be used.

Additionally, when multiple clock buffers 231 are driven by a same clock source, such as for example either a TX output clock signal 227 or an RX output clock signal 427, a phase relationship among outputs of such clock buffers 231 may be ensured by having a reset or clock enable signal coming from a same synchronizer. FIG. 5 illustratively depicts how multiple clock buffers 500 driven by a same clock source can ensure such a phase relationship. Along those lines, known CAE software tools may be used to determine which group of clock buffers 231 are driven by a same clock source. Such software tools may set multiplexer selection signals accordingly so all dividers of such group of clock buffers receive the same reset or clock enable signal.

With the above general description borne in mind, clock buffers 500 of FIG. 5 are described below in additional detail. Clock input signals 506, as described below, may be sets of either TX output clock signals 227 or an RX output clock signals 427.

Control signals 501, such as clock enable signals for example, may be respectively provided to a group of registers 503. Registers 502 of group of registers 503 may have their data input ports ("D") all coupled to ground 505. Clock enable signals 501 may be respectively provided to set ports ("S") of registers 502 of group of registers 503. Clock input signals 506 may be respectively provided to clock input ports of registers 502 of group of registers 503.

Control signals 551, such as reset signals for example, may be respectively provided to a group of registers 504. Registers 502 of group of registers 504 may have their data input ports ("D") all coupled to ground 505. Reset signals 551 may be respectively provided to set ports ("S") of registers 502 of group of registers 504. Clock input signals 506 may be respectively provided to clock input ports of registers 502 of group of registers 504.

For purposes of clarity by way of example and not limitation, it shall be assumed that there are 10 clock input signals CLKIN_1 through CLKIN_10; however, fewer or more than 10 clock input signals 506 may be used in other configurations. Along those lines, there may be 10 clock enable signals 501 and 10 reset signals 551. Groups of registers 503 and 504 provide a register stage of clock buffers 500. Outputs of registers 502 of groups of registers 503 and 504 may be provided, along with clock signals 506, to a multiplexer stage 510 of clock buffers 500. Such multiplexer stage 510 may include sets of multiplexers 511-1, 511-2, and 511-3. Each of multiplexers 511-1, 511-2, and 511-3 may be coupled to receive a same multiple-bit wide select signal 509 for respective selection of outputs therefrom. Such select signals may be asserted in accordance with the above-description for phase alignment. Along those lines, a plurality of clock buffers 231 are configurable to selectively have a control select signal 509 in common responsive to having a clock signal of clock signals 506 in common.

Each multiplexer 511-1 of a group of multiplexers 511-1 may be coupled to receive a same set of data inputs 507. Data inputs 507 are data outputs of registers 502 of group of registers 503. Each multiplexer 511-3 of a group of multiplexers 511-3 may be coupled to receive a same set of data inputs 508. Data inputs 508 are data outputs of registers 502 of group of registers 504. Each multiplexer 511-2 of a group of multiplexers 511-2 may be coupled to receive a same set of clock input signals 506.

Continuing the above example of 10 clock input signals 506 for purposes of clarity and not limitation, there may be 24 clock enable multiplexers 511-1, 24 clock input multiplexers 511-2, and 24 reset multiplexers 511-3. Continuing this example, there may be 24 clock enable mask signals 514, 24 reset mask signals 520, 24 logic gates ("AND gates") 519, 24 logic gates 515 ("OR gates"), 24 buffer drivers ('drivers") 516, and 24 dividers 518. However, in other configurations, fewer or more than 24 of each of these components may be used.

Clock enable outputs 513 of multiplexers 511-1 may respectively be provided to input ports of OR gates 515, and clock enable mask signals 514 may likewise be respectively provided to other input ports of OR gates 515. Generally, clock enable mask signals 514 may be respective mask bits, which may or may not be asserted. Furthermore, OR gates 515, as well as clock enable mask signals 514, may be omitted, such as for example for a fixed configuration to generate clock signals. Outputs of OR gates 515 may be respectively provided to clock enable ports of drivers 516 to selectively activate one or more of such drivers 516. Clock outputs 517 of multiplexers 511-2 may be respectively provided as clock inputs to drivers 516. Outputs of drivers 516, which may be respectively provided as inputs to dividers 518, effectively may be one or more of clock input signals 506.

Reset outputs 512 of multiplexers 511-3 may respectively be provided to input ports of AND gates 519, and reset mask signals 520 may likewise be respectively provided to inverted or complemented input ports of AND gates 519. Generally, reset mask signals 520 may be respective mask bits, which may or may not be asserted. Furthermore, AND gates 519, as well as reset mask signals 520, may be omitted, such as for example for a fixed configuration to generate clock signals. Outputs of AND gates 519 may be respectively provided to reset ports of dividers 518 to selectively reset one or more of such dividers 518. Clock output signals 521 of dividers 518 effectively may be one or more of clock input signals 506 selectively having been further divided down in frequency. Continuing the above example of 10 clock input signals 506 for purposes of clarity and not limitation, there may be 24 clock output signals 521, namely CLKOUT_1 through CLKOUT_24. Examples of clock output signals 521 were previously described as system clock signals 234, 235, 434, and 435. Thus, a clock buffer 231 may be used to generate phase aligned clocks, which may be divided down in frequency, and such clock buffer 231 may have clock enable, reset, clock enable mask, and reset mask capabilities.

With above description borne in mind, Table I illustrative depicts settings for clock buffers 500 for a particular example. However, such particular example is provided for purposes of clarity and not limitation only in order to further understanding. Along those lines, the values in such particular example may or may not be used in other use examples, and accordingly other values may be used in other examples. In this example, a clock input signal 506 ("CLKIN-1"), which has a frequency of 500 MHz, is used to drive two clock buffers 231 ("BUFG_GTs") in order to obtain two output clock signals, namely a CLKOUT_1 and a CLKOUT_2. For this example, CLKOUT_1 is to be a 250 MHz clock signal, and CLKOUT_2 is to be a 100 MHz clock signal, and both CLKOUT_1 and CLKOUT_2 are to be synchronized with each other. Table I below illustratively depicts settings for such two clock buffers 231 of clock buffers 500 that may be used to generate CLKOUT_1 and CLKOUT_2 given CLKIN_1 for this example in view of the above example of 10 and 24.

TABLE I

| CLK Source 506 | CE_MUXs 511-1 | CLK_MUXs 511-2 | RST_MUXs 511-3 | Dividers 518 | CLKOUTs 521 |
|---|---|---|---|---|---|
| CLKIN_1 = 500 MHz | CE_MUX_1 = CLKIN_1 | CLK_MUX_1 = CLKIN_1 | RST_MUX_1 = CLKIN_1 | Divider_1 = 2 | CLKOUT_1 = 250 MHz |
| CLKIN_1 = 500 MHz | CE_MUX_24 = CLKIN_1 | CLK_MUX_24 = CLKIN_1 | RST_MUX_24 = CLKIN_1 | Divider_24 = 5 | CLKOUT_24 = 100 MHz |

In view of Table I, depending on the source of a clock input signal, software may be used to select or program CE_MUXs and RST_MUXs via select signal 509 to the same value so that the same CE and RST signals are used for each divider 518 associated therewith.

In order to further appreciate how a fabric PLL may be omitted in applications, some examples of before and after are provided below. These examples are for use of a serializer-deserializer ("SERDES"), as SERDES are sometimes used to move large amounts of data into and out of an FPGA. However, there are examples other than SERDES uses. Furthermore, even though the following examples are for an FPGA, such examples may likewise apply to other types of ICs having one or more transceivers, transmitters, and/or receivers having one or more of the above-described limitations of clocks sourced from PLLs thereof.

Figure 6:
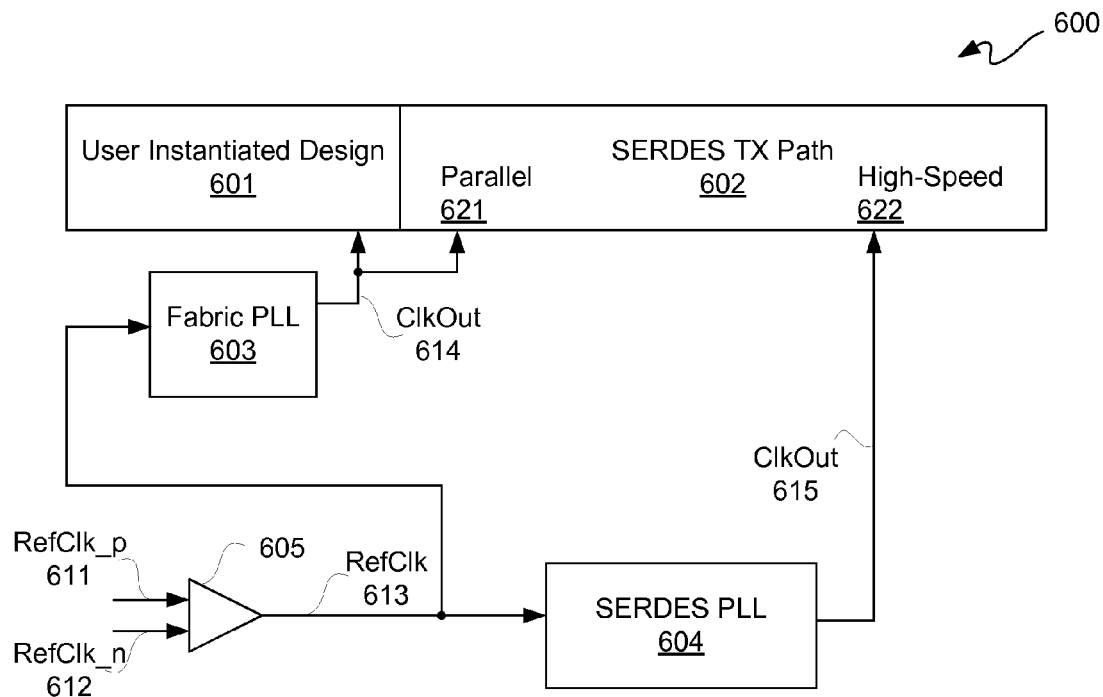
FIG. 6 is a block/circuit diagram depicting a previous or prior exemplary serializer-deserializer ("SERDES") environment, such as in an FPGA.

FIG. 6 is a block/circuit diagram depicting a previous or prior exemplary SERDES environment 600, such as in an FPGA. A positive side reference clock signal 611 and a negative side reference clock signal 612 may be provided to a clock driver 605 to generate a reference clock signal 613. Such reference clock signal 613 may be provided to a reference clock input port of a fabric PLL 603 and a reference clock input port of a SERDES PLL 604. From a PLL output clock port of such a SERDES PLL 604, a clock output signal 615 may be provided to a PLL high-speed clock input port 622 of a SERDES TX path 602 for high-speed data operations. From a clock output port of fabric PLL 603, a clock output signal 614 may be provided as user clock to a user instantiated design 601 and to a user or parallel clock input port 621 of such TX path 602 for parallel data operations.

In this prior example, because a SERDES PLL does not provide an output clock to fabric, a user either had to use a prior TX output clock from a TX path, which had limitations as previously described herein, or provide a reference clock to a fabric PLL. Thus, for applications where limitations of use of a prior TX output clock from a TX path prohibited use of such prior TX output clock, a user incurred power consumption associated with use of a fabric PLL, as well as possibly having to use a more expensive FPGA if fabric PLL was constrained by their design.

Figure 7:
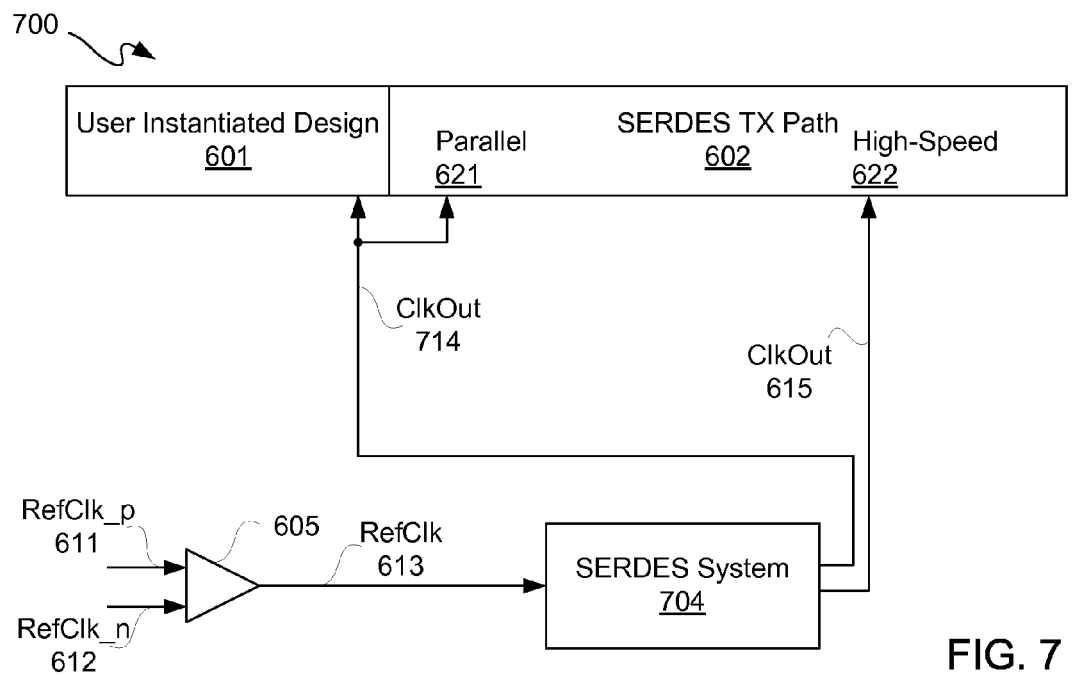
FIG. 7 is a block/circuit diagram depicting an exemplary SERDES environment, such as in an FPGA, in accordance with the description of FIGS. 2 through 5.

FIG. 7 is a block/circuit diagram depicting an exemplary SERDES environment 700, such as in an FPGA, in accordance with the description of FIGS. 2 through 5. In contrast to SERDES environment 600 of FIG. 6, a TX 200 or RX 400 may be used to provide a SERDES system 704, which effectively may have a PLL output clock divided port from which clock output signal 714 may be sourced. More particularly, SERDES system 704 may be formed with one or more TX 200 or RX 400, as well as one or more clock buffers 231. Along those lines, clock output signal 714 may be a system clock signal 234 or 434.

Such clock output signal 714 may be provided to fabric, such as previously described with reference to FIG. 6 as clock output signal 614; however, fabric PLL 603 may be omitted. Again, fabric PLL 603 may be omitted because such clock output signal 714 sourced from a PLL output clock divided port of SERDES PLL 704 avoids one or more of the previously described limitations of a prior TX output clock. Even though the above description was in terms of a TX side, the above description likewise may apply to an RX side for generation of a reference clock signal from a SERDES PLL to be used as a parallel clock provided to fabric. Furthermore, a SERDES PLL, formed using one or more gigabit transceivers such as TX 200 and RX 400 for example, may not have to support very many dividers. Other description with reference to FIG. 7 is the same as that of FIG. 6, and thus is not repeated for purposes of clarity.

Figure 8:
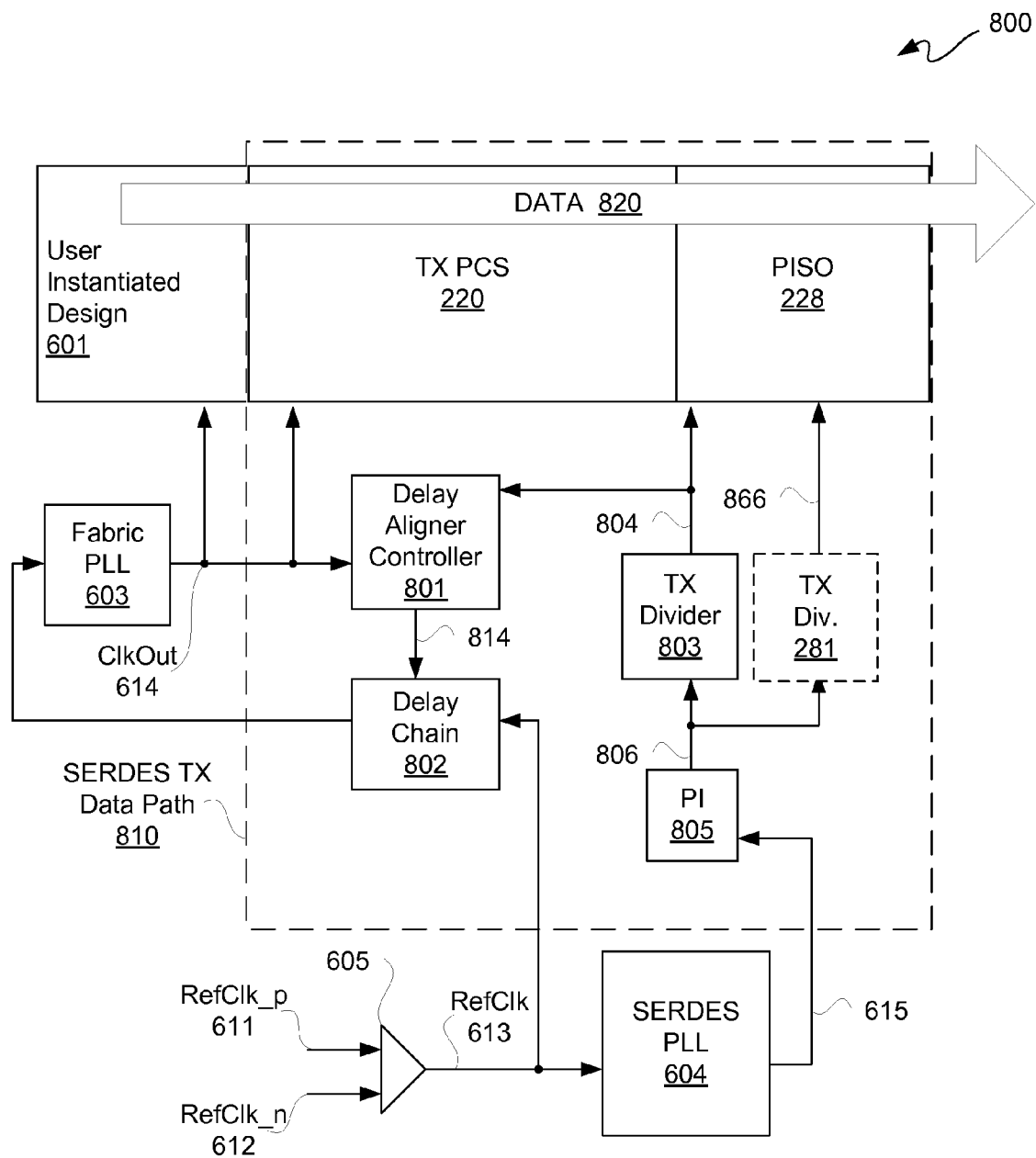
FIG. 8 is a block/circuit diagram depicting a previous or prior exemplary SERDES-PCIe environment, such as in an FPGA.

While there are many applications where a prior TX clock output could not have been used, an example is provided below to further understanding. FIG. 8 is a block/circuit diagram depicting a previous or prior exemplary SERDES-PCIe environment 800, such as in an FPGA.

Flow control mechanism in PCIe and other high-speed communication protocols may negatively affect performance of a link therefor. Such performance may be impacted by an increase in latency and thus a reduction in data throughput. To reduce latency on a TX path, a SERDES may have a buffer bypass. A buffer bypass configuration is not limited to PCIe and other high-speed protocols having a variable latency, but is also applicable to protocols that use a fixed latency, such as CPRI for example among others.

A prior user design using a buffer bypass configuration for a transmit path could not use a prior TX clock output, because of one or more of the above-described limitations of such prior TX clock output. More particularly, because of phase alignment processing, a reference clock from a prior TX path, through a TX delay aligner for temperature and/or other delay variance compensation, was provided to a fabric PLL to produce an application appropriate clock frequency for fabric logic.

With the above-description borne in mind, FIG. 8 is described below in additional detail. A positive side reference clock signal 611 and a negative side reference clock signal 612 may be provided to a clock driver 605 to generate a reference clock signal 613. Such reference clock signal 613 may be provided to a delay chain 802 of a SERDES TX data path 810 and to a reference clock input port of a SERDES PLL 604. From a PLL output clock port of such a SERDES PLL 604, a clock output signal 615 may be provided to a prior PI 805 of SERDES TX data path 810.

After delay by delay chain 802, such delayed reference clock signal 613 may be provided from delay chain 802 to a reference clock input port of a fabric PLL 603. From a clock output port of such a fabric PLL 603, a clock output signal 614 may be provided as a user clock to a user instantiated design 601, to a TX PCS 220 for parallel data operations, and to a delay aligner controller 801 of SERDES TX data path 810. Delay aligner controller 801 may provide a control signal 814 to delay chain 802 to adjust or otherwise control delay of delayed reference clock signal 613 output from delay chain 802. Delay aligner controller 801 in combination with delay chain 802 may be a TX delay aligner 221 of FIG. 2.

A phase interpolated or otherwise adjusted clock output signal 806 from prior PI 805 may be provided to a TX divider 803 for providing a parallel output clock signal 804 and to an optional TX divider 281 for providing a divided clock signal 866. Such parallel output clock signal 804 and such divided clock signal 866 may be provided to PISO 228 for clocking in parallel data and clocking out serial data, respectively. PI 805, TX divider 803, TX divider 281, TX PCS 220, and PISO 228 may all be part of SERDES TX data path 810. Such parallel output clock signal 804 may further be provided to delay aligner controller 801 in order to generate control signal 814.

Thus, data 820 may be clocked in parallel from a user instantiated design 601 to a TX PCS 220 using a fabric PLL 603 supplied clock output signal 614. Such data 820 may be clocked from such TX PCS 220 into PISO 228 for parallel-to-serial conversion using clocks 804 and 806, such as previously described.

Figure 9:
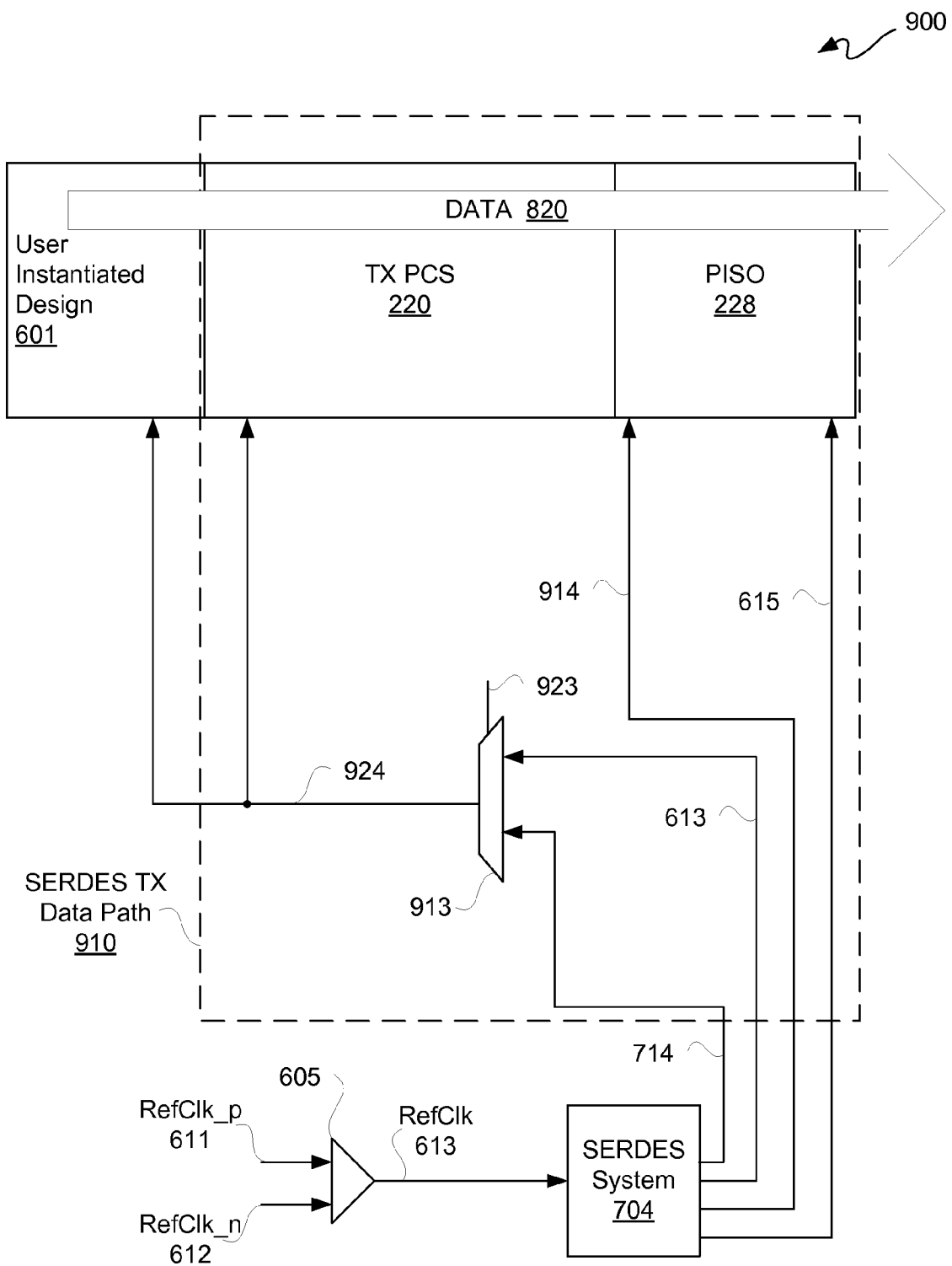
FIG. 9 is a block/circuit diagram depicting an exemplary SERDES-PCIe environment, such as in an FPGA, in accordance with the description of FIGS. 2 through 5.

FIG. 9 is a block/circuit diagram depicting an exemplary SERDES-PCIe environment 900, such as in an FPGA, in accordance with the description of FIGS. 2 through 5. Even though the following description is for a PCIe protocol, other high-speed communication protocols have built in flow control mechanisms, and thus the following description is applicable to any such high-speed communication protocol including but not limited to PCIe. Again, a buffer bypass configuration is not limited to PCIe and other high-speed protocols having a variable latency, but is also applicable to protocols that use a fixed latency, such as CPRI for example among others.

In this example of a SERDES-PCIe environment 900, a buffer bypass configuration for a transmit path is used to provide a TX clock output. A positive side reference clock signal 611 and a negative side reference clock signal 612 may be provided to a clock driver 605 to generate a reference clock signal 613. Such reference clock signal 613 may be provided to a reference clock input port of a SERDES system 704. Reference clock signal 613 may pass through SERDES system 704 without frequency division thereof, including passing through a delay aligner thereof, in order to be output from SERDES system 704 for input to multiplexer 913 of a SERDES TX data path 910.

SERDES system 704 may provide respectively divided versions of such reference clock signal 613 in the form of a clock output signal 714 and an output clock signal 615. Clock output signal 714 may be provided as another input to multiplexer 913. Output clock signal 615 may be provided as a serial clock or high-speed clock input to PISO 228 of SERDES TX data path 910. SERDES system 704 may further provide a divided version of a clock signal to provide parallel clock signal 914.

System or user clock output 924 of multiplexer 913, which may be selected responsive to a control select signal 923 provided thereto, may be provided as an input to TX PCS 220 of SERDES TX data path 910 and to a user instantiated design 601, such as may be instantiated in whole or in part in fabric of an FPGA. A TX delay aligner 221 of FIG. 2 of SERDES system 704 may be used for alignment of clocks 714 and 613 with parallel clock signal 914, where parallel clock signal 914 is likewise output from SERDES system 704. Such parallel clock signal 914 may be provided to PISO 228 for clocking in parallel data, and such parallel clock signal 914 may further be provided to TX delay aligner 221 for adjusting delay of clock signals 613 and 714 for alignment.

Data 820 may be clocked in parallel from a user instantiated design 601 to a TX PCS 220 using a delay adjusted system clock output 924. Such data 820 may be clocked from such TX PCS 220 into PISO 228 for subsequent parallel-to-serial conversion using parallel clock signal 914 and thus may be clock out of PISO 228 using serial clock signal 615.

Accordingly, in a buffer bypass mode, SERDES TX data path 910 may compensate for clock tree delay variation due to temperature changes for example. Output of a TX delay aligner may be used to run fabric logic eliminating a fabric PLL while protecting from delay variance due to temperature.

Figure 10:
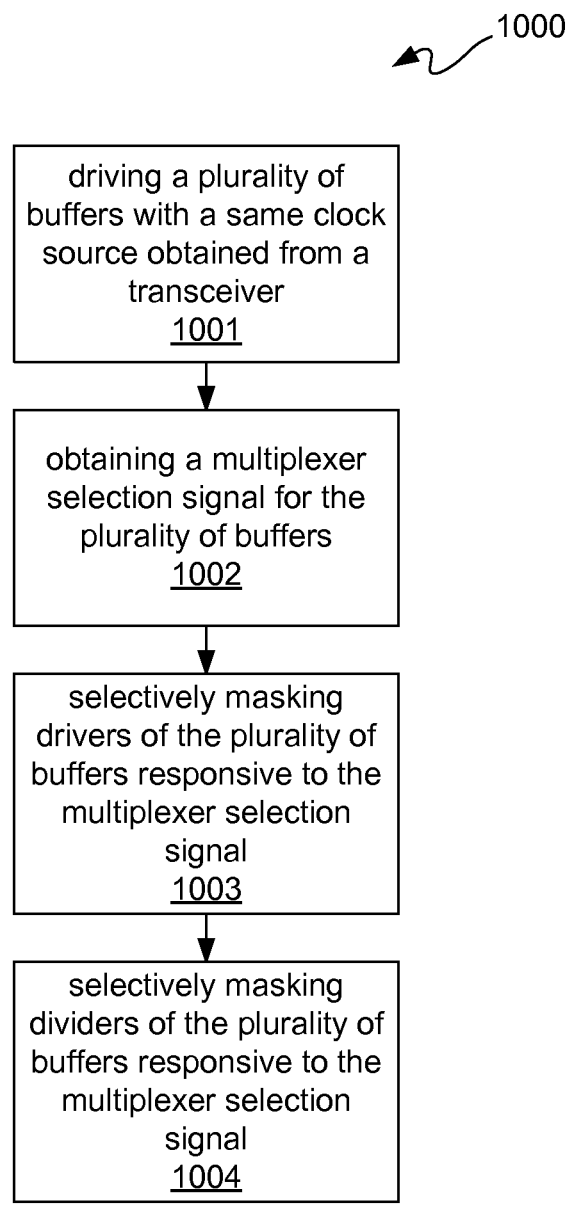
FIG. 10 is a flow diagram depicting an exemplary operations flow for the clock buffers of FIG. 5.

FIG. 10 is a flow diagram depicting an exemplary operations flow 1000 for clock buffers 500 of FIG. 5. Operations flow 1000 is further described with simultaneous reference to FIGS. 5 and 10.

At 1001, clock buffers 500 may be driven with a same clock source. As previously described, such clock source may be output from a TX 200 or RX 400 of a transceiver for example. At 1002, a multiplexer selection signal 509 may be obtained, as previously described, for clock buffers 500. At 1003, drivers 516 of clock buffers 500 may be selectively masked responsive clock enable signals 514 asserted responsive to multiplexer selection signal 509. At 1004, dividers 518 of clock buffers 500 may be selectively masked responsive to reset signals 520 asserted responsive to multiplexer selection signal 509. Thus, some or all of clock buffers 500, which may have a common clock signal sourced from a transceiver, are configurable to selectively have a control select signal in common responsive to having such clock signal in common.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus, comprising:
   a first signal source to provide a first periodic signal;
   a second signal source to provide a second periodic signal;
   a first multiplexer coupled to receive the first periodic signal and the second periodic signal to provide a selected one thereof as a first selected output;
   a phase interpolator coupled to the first multiplexer to receive the first selected output;
   wherein the phase interpolator includes a second multiplexer;
   wherein the second multiplexer is coupled to receive the first selected output and a phase-interpolated version of the first selected output to output a selected one thereof as a second selected output; and
   a divider coupled to the second multiplexer to receive the second selected output to provide a clock signal.

2. The apparatus according to claim 1, further comprising a plurality of buffers coupled to the divider to receive the clock signal.

3. The apparatus according to claim 2, wherein the phase-interpolated version of the first selected output is provided as another output of the phase interpolator.

4. The apparatus according to claim 3, wherein the plurality of buffers are configurable to selectively have a control signal in common responsive to having the clock signal in common.

5. The apparatus according to claim 4, wherein the second selected output is a pre-phase interpolated signal responsive to selection of the first selected output and a post-phase interpolated version of the first selected output responsive to selection of the phase-interpolated version of the first selected output.

6. The apparatus according to claim 2, wherein:
   the divider is coupled to receive the second selected output to provide a divided down version thereof as the clock signal to a third multiplexer;
   the third multiplexer is coupled to selectively provide the clock signal to a delay aligner and a first port of a fourth multiplexer;
   the delay aligner is coupled to a second port of the fourth multiplexer; and
   the clock signal is output from the fourth multiplexer.

7. The apparatus according to claim 6, wherein the divider is a programmable divider.

8. The apparatus according to claim 6, wherein the first signal source and the second signal source are respectively a first phase-locked loop and a second phase-locked loop.

9. The apparatus according to claim 6, wherein the phase interpolator is located in either transmitter or a transmission portion of a transceiver.

10. The apparatus according to claim 1, further comprising:
    a third multiplexer coupled to receive the first periodic signal and the second periodic signal to provide a selected one thereof as a third selected output;
    wherein the second multiplexer is coupled to receive the first selected output, the phase-interpolated version of the first selected output, and the third selected output to provide a selected one thereof as the second selected output.

11. The apparatus according to claim 1, further comprising:
    a bypass path coupled from the first signal source to the second multiplexer;
    wherein the second multiplexer is coupled to receive the first selected output, the phase-interpolated version of the first selected output, and the first periodic signal to provide a selected one thereof as the second selected output.

12. The apparatus according to claim 2, wherein the plurality of buffers comprises:
    a first plurality of registers coupled to respectively receive a plurality of clock signals for clocking thereof;
    a second plurality of registers coupled to respectively receive the plurality of clock signals for clocking thereof;
    wherein the first plurality of registers is coupled to receive a first plurality of control signals;
    wherein the second plurality of registers is coupled to receive a second plurality of control signals;
    a first plurality of multiplexers coupled to the first plurality of registers for selection of which of a first plurality of data outputs from the first plurality of registers to pass;
    a second plurality of multiplexers coupled to the plurality of clock signals for selection of which of the plurality of clock signals to pass;
    a third plurality of multiplexers coupled to the second plurality of registers for selection of which of a second plurality of data outputs from the second plurality of registers to pass;
    a plurality of drivers respectively coupled to the second plurality of multiplexers to receive the plurality of clock signals passed; and
    a plurality of dividers respectively coupled to the plurality of drivers to receive the plurality of clock signals passed.

13. The apparatus according to claim 12, wherein the plurality of buffers further comprises:
- first gates coupled to the first plurality of multiplexers and coupled to receive a first plurality of masking signals for selectively masking the first plurality of data outputs passed; and
- second gates coupled to the third plurality of multiplexers and coupled to receive a second plurality of masking signals for selectively masking the second plurality of data outputs passed.

14. The apparatus according to claim 12, wherein the apparatus is part of a serializer-deserializer ("SERDES") system.

15. An apparatus, comprising:
- a first signal source to provide a first periodic signal;
- a second signal source to provide a second periodic signal;
- a multiplexer coupled to receive the first periodic signal and the second periodic signal to provide a selected one thereof as a selected output;
- a phase interpolator coupled to the multiplexer to receive the selected output to provide a phase-interpolated version of the selected output;
- wherein the phase-interpolated version of the selected output is provided as an output of the phase interpolator;
- a divider coupled to the phase interpolator to receive the phase-interpolated version of the selected output to provide a clock signal; and
- a plurality of buffers coupled to the divider to receive the clock signal.

16. The apparatus according to claim 15, wherein:
- the multiplexer is a first multiplexer;
- the divider is coupled to receive the phase-interpolated version of the selected output to provide a divided down version thereof as the clock signal to a second multiplexer;
- the second multiplexer is coupled to selectively provide the clock signal to a delay aligner and a first port of a third multiplexer;
- the delay aligner is coupled to a second port of the third multiplexer; and
- the clock signal is provided from the third multiplexer.

17. The apparatus according to claim 16, wherein the divider is a programmable divider.

18. The apparatus according to claim 15, wherein the plurality of buffers are configurable to selectively have a control select signal in common responsive to having the clock signal in common.

* * * * *